United States Patent
Kondo

(10) Patent No.: US 12,202,365 B2
(45) Date of Patent: Jan. 21, 2025

(54) ELECTRIC POWER SUPPLY SYSTEM

(71) Applicant: TATSUMI RYOKI CO., LTD, Tokyo (JP)

(72) Inventor: Toyoshi Kondo, Tokyo (JP)

(73) Assignee: TATSUMI RYOKI CO., LTD, Tokyo (JP)

( * ) Notice: Subject to any disclaimer, the term of this patent is extended or adjusted under 35 U.S.C. 154(b) by 0 days.

(21) Appl. No.: 18/730,446

(22) PCT Filed: Feb. 14, 2022

(86) PCT No.: PCT/JP2022/005563
§ 371 (c)(1),
(2) Date: Jul. 19, 2024

(87) PCT Pub. No.: WO2023/152943
PCT Pub. Date: Aug. 17, 2023

(65) Prior Publication Data
US 2024/0416780 A1    Dec. 19, 2024

(51) Int. Cl.
*B60L 53/54* (2019.01)
*B60L 53/52* (2019.01)
(Continued)

(52) U.S. Cl.
CPC .............. *B60L 53/54* (2019.02); *B60L 53/52* (2019.02); *B60L 53/62* (2019.02);
(Continued)

(58) Field of Classification Search
CPC .......... B60L 53/54; B60L 53/52; B60L 53/62; B60L 2210/20; H01M 8/04201;
(Continued)

(56) References Cited

U.S. PATENT DOCUMENTS 11,784,334 B2 * 10/2023 Kitamoto ................ B60L 58/40
307/10.1
2003/0003335 A1 * 1/2003 Kazama .................. B60L 58/30
700/286
(Continued)

FOREIGN PATENT DOCUMENTS

JP    2013-158205 A    8/2013
JP    2015-208132 A    11/2015
(Continued)

OTHER PUBLICATIONS

International Search Report issued in PCT/JP2022/005563 mailed on Apr. 19, 2022 with English Translation (5 pages).
(Continued)

*Primary Examiner* — Daniel Kessie
*Assistant Examiner* — Brian K Baxter
(74) *Attorney, Agent, or Firm* — Nakanishi IP Associates, LLC

(57) ABSTRACT

An electric power supply system supplies electric power to an external load. The system includes a hydrogen supply unit including a hydrogen generation device that performs electrolysis to generate hydrogen, a hydrogen storage unit including a first storage device and a second storage device that store hydrogen obtained by the hydrogen supply unit, a fuel cell unit1 including a fuel cell that generates the electric power based on hydrogen supplied from the hydrogen storage unit, an electric power storage unit including a first electric power storage device and a second electric power storage device that store the electric power obtained by the fuel cell, and a control unit. The control unit controls switching a source of supply of hydrogen to the fuel cell among the first storage device, the second storage device, and both the first storage device and the second storage device.

9 Claims, 2 Drawing Sheets

(51) Int. Cl.
  *B60L 53/62* (2019.01)
  *H01M 8/04082* (2016.01)
  *H01M 8/04537* (2016.01)
  *H01M 8/04746* (2016.01)
  *H01M 8/0656* (2016.01)
  *H02J 7/34* (2006.01)

(52) U.S. Cl.
  CPC ... *H01M 8/04201* (2013.01); *H01M 8/04611* (2013.01); *H01M 8/04753* (2013.01); *H01M 8/0656* (2013.01); *H02J 7/34* (2013.01); *B60L 2210/20* (2013.01); *H02J 2300/30* (2020.01)

(58) Field of Classification Search
  CPC ......... H01M 8/04611; H01M 8/04753; H01M 8/0656; H02J 7/34; H02J 2300/30
  See application file for complete search history.

(56) References Cited

U.S. PATENT DOCUMENTS

| | | | | |
|---|---|---|---|---|
| 2005/0287405 A1* | 12/2005 | Lee | ................... | H01M 8/04225 429/444 |
| 2006/0222917 A1* | 10/2006 | Saito | ................... | B60L 58/34 429/432 |
| 2010/0129692 A1* | 5/2010 | Ueda | ................... | H01M 8/0491 429/431 |
| 2014/0091762 A1* | 4/2014 | Kondo | ................... | H02S 50/10 320/109 |
| 2019/0386491 A1* | 12/2019 | Ito | ................... | H01M 8/0606 |
| 2021/0202967 A1* | 7/2021 | Ogawa | ................... | H01M 8/04828 |
| 2021/0384538 A1* | 12/2021 | Mohri | ................... | H01M 8/04753 |
| 2022/0123336 A1* | 4/2022 | Ito | ................... | B60L 8/003 |
| 2023/0055841 A1* | 2/2023 | Mori | ................... | B60L 53/665 |
| 2023/0246455 A1* | 8/2023 | Kondo | ................... | H02J 7/34 307/84 |
| 2024/0047717 A1* | 2/2024 | Lee | ................... | H01M 8/04947 |

FOREIGN PATENT DOCUMENTS

| | | |
|---|---|---|
| JP | 2016-090035 A | 5/2016 |
| JP | 2019-149265 A | 9/2019 |

OTHER PUBLICATIONS

Written Opinion of International Searching Authority issued in PCT/JP2022/005563 mailed on Apr. 19, 2022 with English Translation (8 pages).

Notification of Reasons for Refusal issued in Japanese Patent Application No. 2022-526388 mailed on Jul. 12, 2022 with English Translation (14 pages).

Decision to Grant Patent issued in Japanese Patent Application No. 2022-526388 mailed on Aug. 5, 2022 with English Translation (7 pages).

* cited by examiner

ELECTRIC POWER SUPPLY SYSTEM

TECHNICAL FIELD

The present invention relates to an electric power supply system and the like.

BACKGROUND ART

Hitherto, there has been proposed an electric vehicle charge/discharge device that stores electric power and supplies the stored electric power to an electric vehicle or the like as in Patent Literature 1.

CITATION LIST

Patent Literature

Patent Literature 1: JP 2015-208132 A

SUMMARY OF INVENTION

Technical Problem

However, charge/discharge control of a plurality of electric power storage devices is not considered.

In this regard, an object of the present invention is to provide an electric power supply system and the like capable of efficiently supplying electric power to a load by using a plurality of electric power sources.

Solution to Problem

An electric power supply system according to the present invention is an electric power supply system that supplies electric power to an external load, the electric power supply system including: a hydrogen supply unit including a hydrogen generation device that performs electrolysis to generate hydrogen; a hydrogen storage unit including a first storage device and a second storage device that store hydrogen obtained by the hydrogen supply unit; a fuel cell unit including a first fuel cell and a second fuel cell that generate the electric power based on hydrogen supplied from the hydrogen storage unit; an electric power storage unit including a first electric power storage device that stores the electric power obtained by the first fuel cell, and a second electric power storage device that stores the electric power obtained by the second fuel cell; and a control unit.

The control unit controls switching a source of supply of hydrogen to the first fuel cell among the first storage device, the second storage device, and both the first storage device and the second storage device.

The control unit controls switching a source of supply of hydrogen to the second fuel cell among the first storage device, the second storage device, and both the first storage device and the second storage device.

Electric power supply to the load is performed from the first electric power storage device, the second electric power storage device, or both the first electric power storage device and the second electric power storage device.

One (for example, the first storage device) of the plurality of hydrogen storage devices can be filled with hydrogen, and the other (for example, the second storage device) can supply hydrogen to the fuel cell.

One (for example, the first fuel cell) of the plurality of fuel cells can be rested, and the other can supply electric power to the electric power storage device (for example, the second fuel cell).

Further, it is possible to supply electric power to the external load by using the electric power storage device (for example, the first electric power storage device) that is not being charged.

Therefore, it is possible to safely fill and discharge hydrogen.

In addition, it is possible to reduce a burden on the fuel cell and the electric power storage device and to make the fuel cell and the electric power storage device less likely to deteriorate.

Preferably, when electric power supply from the first electric power storage device to the load is performed, the control unit stops supply of hydrogen to the first fuel cell and allows supply of hydrogen to the second fuel cell.

When electric power supply from the second electric power storage device to the load is performed, the control unit stops supply of hydrogen to the second fuel cell and allows supply of hydrogen to the first fuel cell.

When electric power supply from the first electric power storage device and the second electric power storage device to the load is performed, the control unit stops supply of hydrogen to the first fuel cell and the second fuel cell.

More preferably, the fuel cell unit includes a third fuel cell that generates the electric power based on hydrogen supplied from the hydrogen storage unit.

The electric power storage unit includes a third electric power storage device that stores the electric power obtained by the third fuel cell.

The control unit controls switching a source of supply of hydrogen to the first fuel cell among the first storage device, the second storage device, the third storage device, and at least two of the first storage device, the second storage device, and the third storage device.

The control unit controls switching a source of supply of hydrogen to the second fuel cell among the first storage device, the second storage device, the third storage device, and at least two of the first storage device, the second storage device, and the third storage device.

More preferably, when supply of hydrogen from the first storage device to at least one of the first fuel cell, the second fuel cell, or the third fuel cell is performed, the control unit stops supply of hydrogen from the hydrogen generation device to the first storage device, and allows supply of hydrogen from the hydrogen generation device to the second storage device.

When supply of hydrogen from the second storage device to at least one of the first fuel cell, the second fuel cell, or the third fuel cell is performed, the control unit stops supply of hydrogen from the hydrogen generation device to the second storage device, and allows supply of hydrogen from the hydrogen generation device to the first storage device.

More preferably, the electric power supply system further include a first conversion unit including a first conversion device, a second conversion device, and a third conversion device.

The first conversion device converts a flow of electricity of the electric power from the first fuel cell from direct current to alternating current, further converts the flow from alternating current to direct current, and adjusts a voltage to a predetermined voltage for electric power storage in the first electric power storage device.

The second conversion device converts a flow of electricity of the electric power from the second fuel cell from direct current to alternating current, further converts the flow from alternating current to direct current, and adjusts a voltage to a predetermined voltage for electric power storage in the second electric power storage device.

The third conversion device converts a flow of electricity of the electric power from the third fuel cell from direct current to alternating current, further converts the flow from alternating current to direct current, and adjusts a voltage to a predetermined voltage for electric power storage in the third electric power storage device.

As compared with a mode in which electric power is supplied to the electric power storage device without conversion into alternating current, adjustment to a voltage suitable for charging the electric power storage device can be easily performed.

Preferably, the electric power supply system further includes: an electric power generation unit including at least one of a first electric power generation device that generates direct current power based on natural energy or a second electric power generation device that generates alternating current power based on natural energy; a compression unit configured to compress hydrogen obtained by the hydrogen generation device; and a power generation unit configured to generate power based on natural energy without conversion into electric power.

The hydrogen generation device performs the electrolysis based on electric power from the electric power generation unit.

The compression unit is driven based on the power obtained by the power generation unit.

The power generated by the power generation unit is used to drive the compression unit. Therefore, it is possible to efficiently perform electrolysis using the electric power obtained by the electric power generation unit to generate a large amount of hydrogen.

More preferably, the hydrogen supply unit includes a pump that supplies an electrolyte to the hydrogen generation device.

The pump and the compression unit are driven based on the power obtained by the power generation unit.

Preferably, the power generation unit generates a rotational force as the power based on at least one of wind power or wave force.

The compression unit is driven based on the rotational force obtained by the power generation unit.

Preferably, the electric power supply system further includes an electric power generation unit including at least one of a first electric power generation device that generates direct current power based on natural energy or a second electric power generation device that generates alternating current power based on natural energy.

The hydrogen generation device performs the electrolysis based on electric power from the electric power generation unit.

An electric power supply system according to the present invention is an electric power supply system that supplies electric power to an external load, and includes a hydrogen supply unit including a hydrogen generation device that performs electrolysis to generate hydrogen, a hydrogen storage unit including a first storage device and a second storage device that store hydrogen obtained by the hydrogen supply unit, a fuel cell unit including a fuel cell that generates electric power based on hydrogen supplied from the hydrogen storage unit, an electric power storage unit including first and second electric power storage devices that store the electric power obtained by the fuel cell, and a control unit.

The control unit controls switching a source of supply of hydrogen to the fuel cell among the first storage device, the second storage device, and both the first storage device and the second storage device.

Electric power supply to the load is performed from the first electric power storage device, the second electric power storage device, or both the first electric power storage device and the second electric power storage device.

One (for example, the first storage device) of the plurality of hydrogen storage devices can be filled with hydrogen, and the other (for example, the second storage device) can supply hydrogen to the fuel cell.

In addition, it is possible to supply electric power to the external load by using the electric power storage device (for example, the first electric power storage device) that is not being charged.

Therefore, it is possible to safely fill and discharge hydrogen.

In addition, it is possible to reduce a burden on the electric power storage device and to make the electric power storage device less likely to deteriorate.

Advantageous Effects of Invention

As described above, according to the present invention, it is possible to provide an electric power supply system and the like capable of efficiently supplying electric power to a load by using a plurality of electric power sources.

DESCRIPTION OF EMBODIMENTS

Hereinafter, a first embodiment will be described with reference to the drawings.

Note that the embodiment is not limited to the following embodiment. In addition, the contents described in one embodiment are similarly applied to other embodiments in principle. Further, each embodiment and each modification can be appropriately combined.

(Electric Power Supply System 1)

Figure 1:
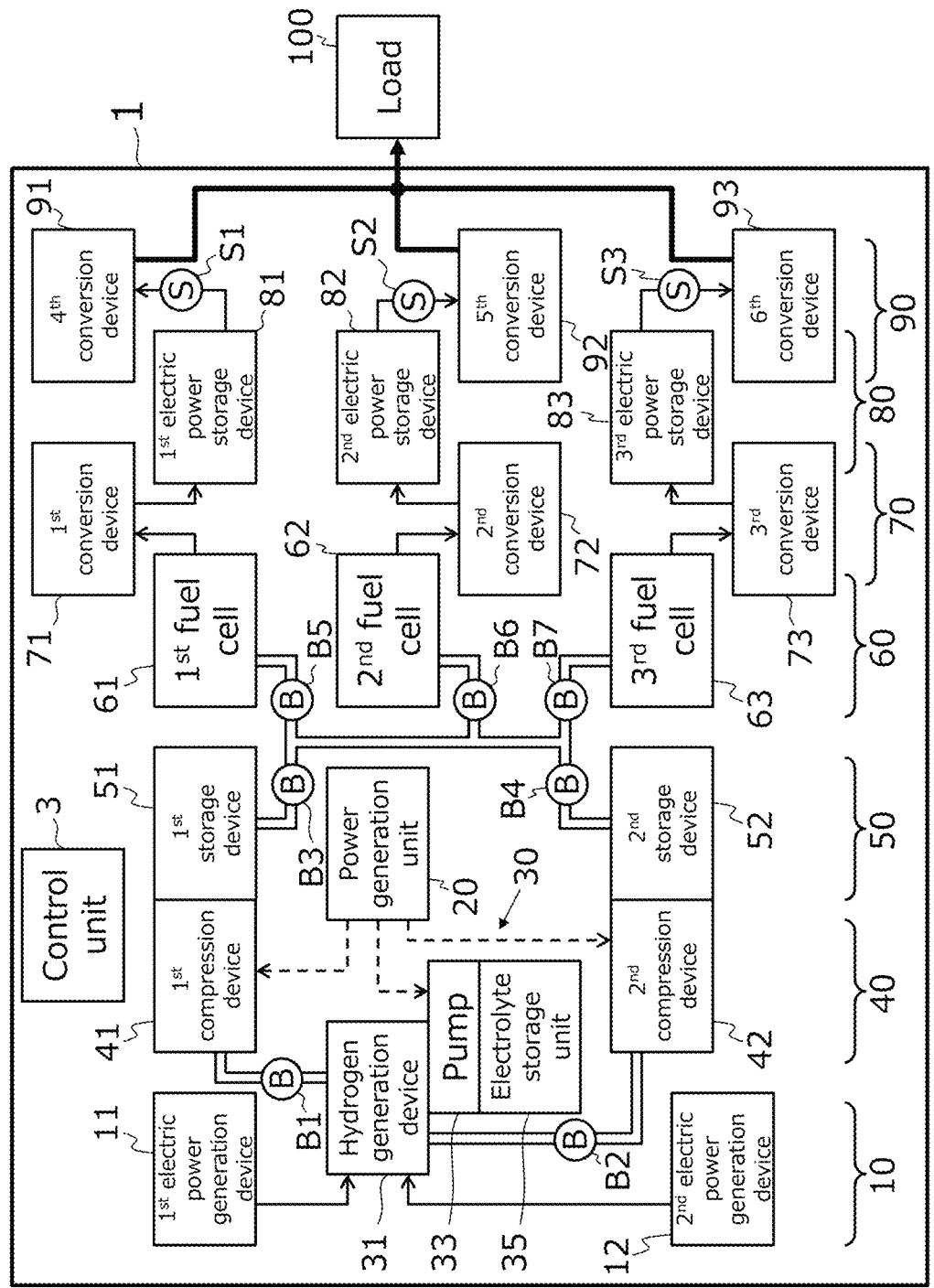
FIG. 1 is a configuration diagram of an electric power supply system according to a first embodiment.

An electric power supply system 1 of the first embodiment includes an electric power generation unit 10, a hydrogen generation unit 20, a hydrogen supply unit 30, a compression unit 40, a hydrogen storage unit 50, a fuel cell unit 60, a first conversion unit 70, an electric power storage unit 80, a second conversion unit 90, first to seventh valves B1 to B7, and first to third switches S1 to S3 (see FIG. 1).

(Control Unit 3)

A control unit 3 controls each unit of the electric power supply system 1.

In particular, the first valve B1 and the like are controlled based on an electric power generation state in the electric power generation unit 10, a filling state of an electrolyte in a hydrogen generation device 31, a filling state of hydrogen in the hydrogen storage unit 50, a storage state in the electric power storage unit 80, a use state of a load 100, and the like.

For example, the control unit 3 controls switching a source of supply of hydrogen to a first fuel cell 61 among a first storage device 51, a second storage device 52, a third storage device 53, and at least two of the first storage device 51, the second storage device 52, and the third storage device 53.

Further, the control unit 3 controls switching a source of supply of hydrogen to a second fuel cell 62 among the first storage device 51, the second storage device 52, the third storage device 53, and at least two of the first storage device 51, the second storage device 52, and the third storage device 53.

For example, when supply of electric power from a first electric power storage device 81 to the load 100 is performed, the control unit 3 stops supply of hydrogen to the first fuel cell 61, and allows supply of hydrogen to the second fuel cell 62 and a third fuel cell 63.

When supply of electric power from a second electric power storage device 82 to the load 100 is performed, the control unit 3 stops supply of hydrogen to the second fuel cell 62, and allows supply of hydrogen to the first fuel cell 61 and the third fuel cell 63.

When supply of electric power from a third electric power storage device 83 to the load 100 is performed, the control unit 3 stops supply of hydrogen to the third fuel cell 63, and allows supply of hydrogen to the first fuel cell 61 and the second fuel cell 62.

When supply of electric power from the first electric power storage device 81, the second electric power storage device 82, and the third electric power storage device 83 to the load 100 is performed, the control unit 3 stops supply of hydrogen to the first fuel cell 61, the second fuel cell 62, and the third fuel cell 63.

For example, when supply of hydrogen from the first storage device 51 to at least one of the first fuel cell 61, the second fuel cell 62, or the third fuel cell 63 is performed, the control unit 3 stops supply of hydrogen from the hydrogen generation device 31 to the first storage device 51, and allows supply of hydrogen from the hydrogen generation device 31 to the second storage device 52.

When supply of hydrogen from the second storage device 52 to at least one of the first fuel cell 61, the second fuel cell 62, or the third fuel cell 63 is performed, the control unit 3 stops supply of hydrogen from the hydrogen generation device 31 to the second storage device 52, and allows supply of hydrogen from the hydrogen generation device 31 to the first storage device 51.

Specific control contents are described below.

(Electric Power Generation Unit 10)

The electric power generation unit 10 includes a first electric power generation device 11 and a second electric power generation device 12.

The first electric power generation device 11 is an electric power generation device (renewable energy-derived electric power generation device) that generates direct-current (DC) power based on natural energy (renewable energy), such as a solar power generation device.

The first electric power generation device 11 is always in a state where electric power generation can be performed.

The electric power obtained by the first electric power generation device 11 is supplied to the hydrogen generation device 31.

The first electric power generation device 11 includes a backflow prevention device such as a diode.

The second electric power generation device 12 is a power generation device (renewable energy-derived electric power generation device) that generates alternating-current (AC) power based on natural energy (renewable energy), such as a wind power generation device or a wave power generation device.

The second electric power generation device 12 is always in a state where electric power generation can be performed.

However, in a case where the second electric power generation device 12 is a wind power generation device, and wind power received by the second electric power generation device 12 exceeds predetermined wind power, the second electric power generation device 12 is brought into a state where electric power generation cannot be performed.

The electric power obtained by the second electric power generation device 12 is supplied to the hydrogen generation device 31.

The second electric power generation device 12 includes an AC/DC converter that converts a flow of electricity of the electric power generated by the second electric power generation device 12 from alternating current to direct current.

(Power Generation Unit 20)

The power generation unit 20 generates power such as a rotational force based on natural energy without converting the natural energy into electric power.

For example, the power generation unit 20 includes a turbine or the like, and generates a rotational force as said power based on wind power, wave power, geothermal heat, or the like.

The rotational force generated by the power generation unit 20 is transmitted to a pump 33, a first compression device 41, and a second compression device 42 (see broken arrows in FIG. 1).

(Hydrogen Supply Unit 30)

The hydrogen supply unit 30 includes the hydrogen generation device 31, the pump 33, and an electrolyte storage unit 35.

The hydrogen generation device 31 performs electrolysis of the electrolyte such as water to generate hydrogen.

Hydrogen obtained by the hydrogen generation device 31 is accumulated in the hydrogen storage unit 50 (the first storage device 51 and the second storage device 52) via the compression unit 40 (the first compression device 41 and the second compression device 42).

Oxygen generated by the electrolysis may be released into the atmosphere or may be used in the fuel cell unit 60 described below.

The pump 33 sucks the electrolyte from the electrolyte storage unit 35, and supplies the electrolyte to the hydrogen generation device 31.

A mechanical element (such as a spiral blade) included in the pump 33 is driven (rotates) based on the rotational force transmitted from the power generation unit 20.

However, in a case where the rotational force transmitted from the power generation unit 20 is not sufficient, the pump 33 is driven based on the electric power supplied from the first electric power generation device 11 or the second electric power generation device 12. That is, the mechanical element included in the pump 33 is also driven (rotate) by an electric device such as a motor.

The electrolyte storage unit 35 stores the electrolyte.

As the electrolyte, water such as tap water may be used, or water obtained by reaction of hydrogen and oxygen in the fuel cell unit 60 may be used.

(Compression Unit 40)

The compression unit 40 includes the first compression device 41 and the second compression device 42.

The first compression device 41 compresses hydrogen obtained by the hydrogen generation device 31 in order to store hydrogen in the first storage device 51.

A mechanical element (such as a turbine) included in the first compression device 41 is driven (rotates) based on the rotational force transmitted from the power generation unit 20.

However, in a case where the rotational force transmitted from the power generation unit 20 is not sufficient, the first compression device 41 is driven based on the electric power supplied from the first electric power generation device 11 or the second electric power generation device 12. That is, the mechanical element included in the first compression device 41 is also driven (rotates) by an electric device such as a motor.

The second compression device 42 compresses hydrogen obtained by the hydrogen generation device 31 in order to store hydrogen in the second storage device 52.

A mechanical element (such as a turbine) included in the second compression device 42 is driven (rotates) based on the rotational force transmitted from the power generation unit 20.

However, in a case where the rotational force transmitted from the power generation unit 20 is not sufficient, the second compression device 42 is driven based on the electric power supplied from the first electric power generation device 11 or the second electric power generation device 12. That is, the mechanical element included in the second compression device 42 is also driven (rotates) by an electric device such as a motor.

(Hydrogen Storage Unit 50)

The hydrogen storage unit 50 includes the first storage device 51 and the second storage device 52.

The first storage device 51 stores compressed hydrogen.

The second storage device 52 stores compressed hydrogen.

Hydrogen stored in the first storage device 51 and hydrogen stored in the second storage device 52 are supplied to the fuel cell unit 60 (the first fuel cell 61, the second fuel cell 62, and the third fuel cell 63).

(Fuel Cell Unit 60)

The fuel cell unit 60 includes the first fuel cell 61, the second fuel cell 62, and the third fuel cell 63.

The first fuel cell 61, the second fuel cell 62, and the third fuel cell 63 are electric power generation devices (fuel cells) that generate electric power based on hydrogen supplied from at least one of the first storage device 51 or the second storage device 52.

(First Conversion Unit 70)

The first conversion unit 70 includes a first conversion device 71, a second conversion device 72, and a third conversion device 73.

The first conversion device 71 includes a DC/AC inverter and an AC/DC converter, converts a flow of electricity of the electric power from the first fuel cell 61 from direct current to alternating current, further converts the flow from alternating current to direct current, and adjusts a voltage to a predetermined value for electric power storage in the first electric power storage device 81.

The second conversion device 72 includes a DC/AC inverter and an AC/DC converter, converts a flow of electricity of the electric power from the second fuel cell 62 from direct current to alternating current, further converts the flow from alternating current to direct current, and adjusts a voltage to a predetermined value for electric power storage in the second electric power storage device 82.

The third conversion device 73 includes a DC/AC inverter and an AC/DC converter, converts a flow of electricity of the electric power from the third fuel cell 63 from direct current to alternating current, further converts the flow from alternating current to direct current, and adjusts a voltage to a predetermined value for electric power storage in the third electric power storage device 83.

(Electric Power Storage Unit 80)

The electric power storage unit 80 includes the first electric power storage device 81, the second electric power storage device 82, and the third electric power storage device 83.

The first electric power storage device 81, the second electric power storage device 82, and the third electric power storage device 83 are wired in parallel.

The first electric power storage device 81 includes a charge device and an electric power storage device for storing the electric power from the first fuel cell 61.

The second electric power storage device 82 includes a charge device and an electric power storage device for storing the electric power from the second fuel cell 62.

The third electric power storage device 83 includes a charge device and an electric power storage device for storing the electric power from the third fuel cell 63.

(Second Conversion Unit 90)

The second conversion unit 90 includes a fourth conversion device 91, a fifth conversion device 92, and a sixth conversion device 93.

The fourth conversion device 91 includes a DC/AC inverter, converts a flow of electricity of electric power from the first electric power storage device 81 from direct current to alternating current, and adjusts a voltage to a predetermined value (for example, three-phase 200 V) for driving the load 100.

The fifth conversion device 92 includes a DC/AC inverter, converts a flow of electricity of electric power from the second electric power storage device 82 from direct current to alternating current, and adjusts a voltage to a predetermined value (for example, three-phase 200 V) for driving the load 100.

The sixth conversion device 93 includes a DC/AC inverter, converts a flow of electricity of electric power from the third electric power storage device 83 from direct current to alternating current, and adjusts a voltage to a predetermined value (for example, three-phase 200 V) for driving the load 100.

(First and Second Valves B1 and B2)

The first valve B1 is provided between the hydrogen generation device 31 and the first compression device 41.

The first valve B1 controls a supply amount of hydrogen from the hydrogen generation device 31 to the first compression device 41.

The second valve B2 is provided between the hydrogen generation device 31 and the second compression device 42.

The second valve B2 controls a supply amount of hydrogen from the hydrogen generation device 31 to the second compression device 42.

(Third and Fourth Valves B3 and B4)

The third valve B3 is provided between the first storage device 51 and the first to third fuel cells 61 to 63 on a hydrogen discharge side of the first storage device 51.

The third valve B3 controls a supply amount of hydrogen from the first storage device 51 to at least one of the first to third fuel cells 61 to 63.

The fourth valve B4 is provided between the second storage device 52 and the first to third fuel cells 61 to 63 on a hydrogen discharge side of the second storage device 52.

The fourth valve B4 controls a supply amount of hydrogen from the second storage device 52 to at least one of the first to third fuel cells 61 to 63.

(Fifth to Seventh Valves B5 to B7)

The fifth valve B5 is provided between the first and second storage devices 51 and 52 and the first fuel cell 61 on a hydrogen intake port side of the first fuel cell 61.

The fifth valve B5 controls a supply amount of hydrogen from at least one of the first storage device 51 or the second storage device 52 to the first fuel cell 61.

The sixth valve B6 is provided between the first and second storage devices 51 and 52 and the second fuel cell 62 on a hydrogen intake port side of the second fuel cell 62.

The sixth valve B6 controls a supply amount of hydrogen from at least one of the first storage device 51 or the second storage device 52 to the second fuel cell 62.

The seventh valve B7 is provided between the first and second storage devices 51 and 52 and the third fuel cell 63 on a hydrogen intake port side of the third fuel cell 63.

The seventh valve B7 controls a supply amount of hydrogen from at least one of the first storage device 51 or the second storage device 52 to the third fuel cell 63.

(First to Third Switches S1 to S3)

The first switch S1 is provided between the first electric power storage device 81 and the fourth conversion device 91.

The first switch S1 performs on/off control of electric power supply from the first electric power storage device 81 to the fourth conversion device 91.

The second switch S2 is provided between the second electric power storage device 82 and the fifth conversion device 92.

The second switch S2 performs on/off control of electric power supply from the second electric power storage device 82 to the fifth conversion device 92.

The third switch S3 is provided between the third electric power storage device 83 and the sixth conversion device 93.

The third switch S3 performs on/off control of electric power supply from the third electric power storage device 83 to the sixth conversion device 93.

For example, in a case where the third valve B3, the sixth valve B6, and the seventh valve B7 are opened and the fourth valve B4 and the fifth valve B5 are closed, hydrogen is supplied from the first storage device 51 to the second fuel cell 62 and the third fuel cell 63. Accordingly, electric power is supplied from the second fuel cell 62 to the second electric power storage device 82, and electric power is supplied from the third fuel cell 63 to the third electric power storage device 83.

At this time, the second switch S2 and the third switch S3 are turned off, and electric power supply from the second electric power storage device 82 and the third electric power storage device 83 to the load 100 is stopped.

(Operation Control)

Operation control of the first valve B1 and the like by the control unit 3 will be described.

The electric power generation unit 10 (the first electric power generation device 11 and the second electric power generation device 12) and the power generation unit 20 are constantly driven.

However, in a case where the first electric power generation device 11 is a solar power generation device and light is not sufficiently supplied at night, the first electric power generation device 11 hardly generates electric power.

In addition, in a case where the second electric power generation device 12 is a wind power generation device and wind is hardly blowing, the second electric power generation device 12 hardly generates electric power.

Moreover, in a case where the power generation unit 20 generates a rotational force based on wind power and is hardly blowing, the power generation unit 20 hardly generates the rotational force.

In a case where electric power P11 supplied from the first electric power generation device 11 and the second electric power generation device 12 is equal to or greater than a power threshold Thp, hydrogen generation is performed.

(Control of Supply of Electric Power to Power Generation Unit 20)

In a case where a rotation amount rv1 per unit time of the power generation unit 20 is equal to or greater than a rotation amount threshold Thrv, the control unit 3 supplies electric power from the first electric power generation device 11 and the second electric power generation device 12 to the hydrogen generation device 31. In this case, the pump 33, the first compression device 41, and the second compression device 42 are driven based on the rotational force transmitted from the power generation unit 20.

When the rotation amount rv1 per unit time of the power generation unit 20 is smaller than the rotation amount threshold Thrv, the control unit 3 supplies electric power from the first electric power generation device 11 and the second electric power generation device 12 to the hydrogen generation device 31, the pump 33, the first compression device 41, and the second compression device 42. In this case, the pump 33, the first compression device 41, and the second compression device 42 are driven based on the electric power from the first electric power generation device 11 and the second electric power generation device 12.

(Control of Supply of Electrolyte to Hydrogen Generation Device 31)

In a case where a remaining amount qv1 of the electrolyte in the hydrogen generation device 31 is smaller than a remaining amount threshold Thqv, the control unit 3 operates the pump 33 in such a way that the electrolyte is supplied from the electrolyte storage unit 35 to the hydrogen generation device 31.

(Hydrogen Discharge Control of First Storage Device 51 and Second Storage Device 52)

In a case where a hydrogen filling rate (first hydrogen filling rate rh1) in the first storage device 51 is lower than a hydrogen filling rate threshold Thrh, the control unit 3 opens the first valve B1 to supply hydrogen from the hydrogen generation device 31 to the first storage device 51 via the first compression device 41.

In a case where a hydrogen filling rate (second hydrogen filling rate rh2) in the second storage device 52 is lower than the hydrogen filling rate threshold Thrh, the control unit 3 opens the second valve B2 to supply hydrogen from the hydrogen generation device 31 to the second storage device 52 via the second compression device 42.

However, in a case where the electric power P11 supplied from the first electric power generation device 11 and the second electric power generation device 12 is smaller than the power threshold Thp, hydrogen generation cannot be performed, and thus the control unit 3 closes the first valve B1 and the second valve B2.

(Charge/Discharge Control of First Electric Power Storage Device 81)

In a case where a charge rate (first charge rate R1) of the first electric power storage device 81 is lower than a charge rate threshold Thrc and the first hydrogen filling rate rh1 is equal to or higher than the hydrogen filling rate threshold Thrh, the control unit 3 opens the third valve B3 and the fifth valve B5 to supply hydrogen from the first storage device 51 to the first fuel cell 61. In this case, the control unit 3 turns off the first switch S1 so that electric power is not supplied from the first electric power storage device 81 to the load 100 via the fourth conversion device 91.

The first fuel cell 61 generates electric power based on hydrogen supplied from the first storage device 51, and supplies the electric power to the first electric power storage device 81 via the first conversion device 71.

In a case where the first charge rate R1 is lower than the charge rate threshold Thrc and the second hydrogen filling rate rh2 is equal to or higher than the hydrogen filling rate threshold Thrh, the control unit 3 opens the fourth valve B4 and the fifth valve B5 to supply hydrogen from the second storage device 52 to the first fuel cell 61. In this case, the control unit 3 turns off the first switch S1 so that electric power is not supplied from the first electric power storage device 81 to the load 100 via the fourth conversion device 91.

The first fuel cell 61 generates electric power based on hydrogen supplied from the second storage device 52, and supplies the electric power to the first electric power storage device 81 via the first conversion device 71.

In a case where the first charge rate R1 is equal to or higher than the charge rate threshold Thrc, the control unit 3 turns on the first switch S1 so that electric power is supplied from the first electric power storage device 81 to the load 100 via the fourth conversion device 91. At this time, it is desirable that the fifth valve B5 is closed so that electric power is not supplied from the first fuel cell 61 to the first electric power storage device 81 via the first conversion device 71.

(Charge/Discharge Control of Second Electric Power Storage Device 82)

In a case where a charge rate (second charge rate R2) of the second electric power storage device 82 is lower than the charge rate threshold Thrc and the first hydrogen filling rate rh1 is equal to or higher than the hydrogen filling rate threshold Thrh, the control unit 3 opens the third valve B3 and the sixth valve B6 to supply hydrogen from the first storage device 51 to the second fuel cell 62. In this case, the control unit 3 turns off the second switch S2 so that electric power is not supplied from the second electric power storage device 82 to the load 100 via the fifth conversion device 92.

The second fuel cell 62 generates electric power based on hydrogen supplied from the first storage device 51, and supplies the electric power to the second electric power storage device 82 via the second conversion device 72.

In a case where the second charge rate R2 is lower than the charge rate threshold Thrc and the second hydrogen filling rate rh2 is equal to or higher than the hydrogen filling rate threshold Thrh, the control unit 3 opens the fourth valve B4 and the sixth valve B6 to supply hydrogen from the second storage device 52 to the second fuel cell 62. In this case, the control unit 3 turns off the second switch S2 so that electric power is not supplied from the second electric power storage device 82 to the load 100 via the fifth conversion device 92.

The second fuel cell 62 generates electric power based on hydrogen supplied from the second storage device 52, and supplies the electric power to the second electric power storage device 82 via the second conversion device 72.

In a case where the second charge rate R2 is equal to or higher than the charge rate threshold Thrc, the control unit 3 turns on the second switch S2 so that power is supplied from the second electric power storage device 82 to the load 100 via the fifth conversion device 92. At this time, it is desirable that the sixth valve B6 is closed so that electric power is not supplied from the second fuel cell 62 to the second electric power storage device 82 via the second conversion device 72.

(Charge/Discharge Control of Third Electric Power Storage Device 83)

In a case where a charge rate (third charge rate R3) of the third electric power storage device 83 is lower than the charge rate threshold Thrc and the first hydrogen filling rate rh1 is equal to or higher than the hydrogen filling rate threshold Thrh, the control unit 3 opens the third valve B3 and the seventh valve B7 to supply hydrogen from the first storage device 51 to the third fuel cell 63. In this case, the control unit 3 turns off the third switch S3 so that electric power is not supplied from the third electric power storage device 83 to the load 100 via the sixth conversion device 93.

The third fuel cell 63 generates electric power based on hydrogen supplied from the first storage device 51, and supplies the electric power to the third electric power storage device 83 via the third conversion device 73.

In a case where the third charge rate R3 is lower than the charge rate threshold Thrc and the second hydrogen filling rate rh2 is equal to or higher than the hydrogen filling rate threshold Thrh, the control unit 3 opens the fourth valve B4 and the seventh valve B7 to supply hydrogen from the second storage device 52 to the third fuel cell 63. In this case, the control unit 3 turns off the third switch S3 so that electric power is not supplied from the third electric power storage device 83 to the load 100 via the sixth conversion device 93.

The third fuel cell 63 generates electric power based on hydrogen supplied from the second storage device 52, and supplies the electric power to the third electric power storage device 83 via the third conversion device 73.

In a case where the third charge rate R3 is equal to or higher than the charge rate threshold Thrc, the control unit 3 turns on the third switch S3 so that power is supplied from the third electric power storage device 83 to the load 100 via the sixth conversion device 93. At this time, it is desirable that the seventh valve B7 is closed so that electric power is not supplied from the third fuel cell 63 to the third electric power storage device 83 via the third conversion device 73.

(Application Example of Charge/Discharge Control)

In a case where electric power consumed by the load 100 is large and the first charge rate R1, the second charge rate R2, and the third charge rate R3 are all equal to or higher than the charge rate threshold Thrc, the control unit 3 turns on the first switch S1, the second switch S2, and the third switch S3 so that electric power is supplied from the first electric power storage device 81, the second electric power storage device 82, and the third electric power storage device 83 to the load 100. At this time, it is desirable that the fifth valve B5, the sixth valve B6, and the seventh valve B7 are closed so that electric power supply from the first fuel cell 61 to the first electric power storage device 81, electric power supply from the second fuel cell 62 to the second electric power storage device 82, and electric power supply from the third fuel cell 63 to the third electric power storage device 83 are not performed.

The control unit 3 opens the first valve B1 and the second valve B2 to supply hydrogen from the hydrogen generation device 31 to the first storage device 51 and the second storage device 52.

(Effects of Providing Plurality of Hydrogen Storage Devices, Fuel Cells, and Electric Power Storage Devices)

One (for example, the first storage device 51) of the plurality of hydrogen storage devices can be filled with hydrogen, and the other (for example, the second storage device 52) can supply hydrogen to the fuel cell.

One (for example, the first fuel cell 61) of the plurality of fuel cells can be rested, and the other can supply electric power to the electric power storage device (for example, the second fuel cell 62).

Further, it is possible to supply electric power to the external load 100 by using the electric power storage device (for example, the first electric power storage device 81) that is not being charged.

Therefore, it is possible to safely fill and discharge hydrogen.

In addition, it is possible to reduce a burden on the fuel cell and the electric power storage device and to make the fuel cell and the electric power storage device less likely to deteriorate.

(Effect of Supplying Electric Power to Electric Power Storage Device after Conversion from Direct Current to Alternating Current)

As compared with a mode in which electric power is supplied to the electric power storage device without conversion into alternating current, adjustment to a voltage suitable for charging the electric power storage device can be easily performed.

(Effect of Using Power Generation Unit 20)

Power generated by the power generation unit 20 is used to drive the compression unit. Therefore, it is possible to efficiently perform electrolysis using the electric power obtained by the electric power generation unit 10 to generate a large amount of hydrogen.

(Application Examples of Number of Storage Devices, Number of Fuel Cells, and Number of Power Storage Devices)

In the first embodiment, an example using two storage devices (the first storage device 51 and the second storage device 52), three fuel cells (the first fuel cell 61, the second fuel cell 62, and the third fuel cell 63), and three electric power storage devices (the first electric power storage device 81, the second electric power storage device 82, and the third power storage device 83) has been described.

However, the number of storage devices may be three or more. The number of fuel cells may be two or four or more. The number of electric power storage devices may be two or four or more.

Figure 2:
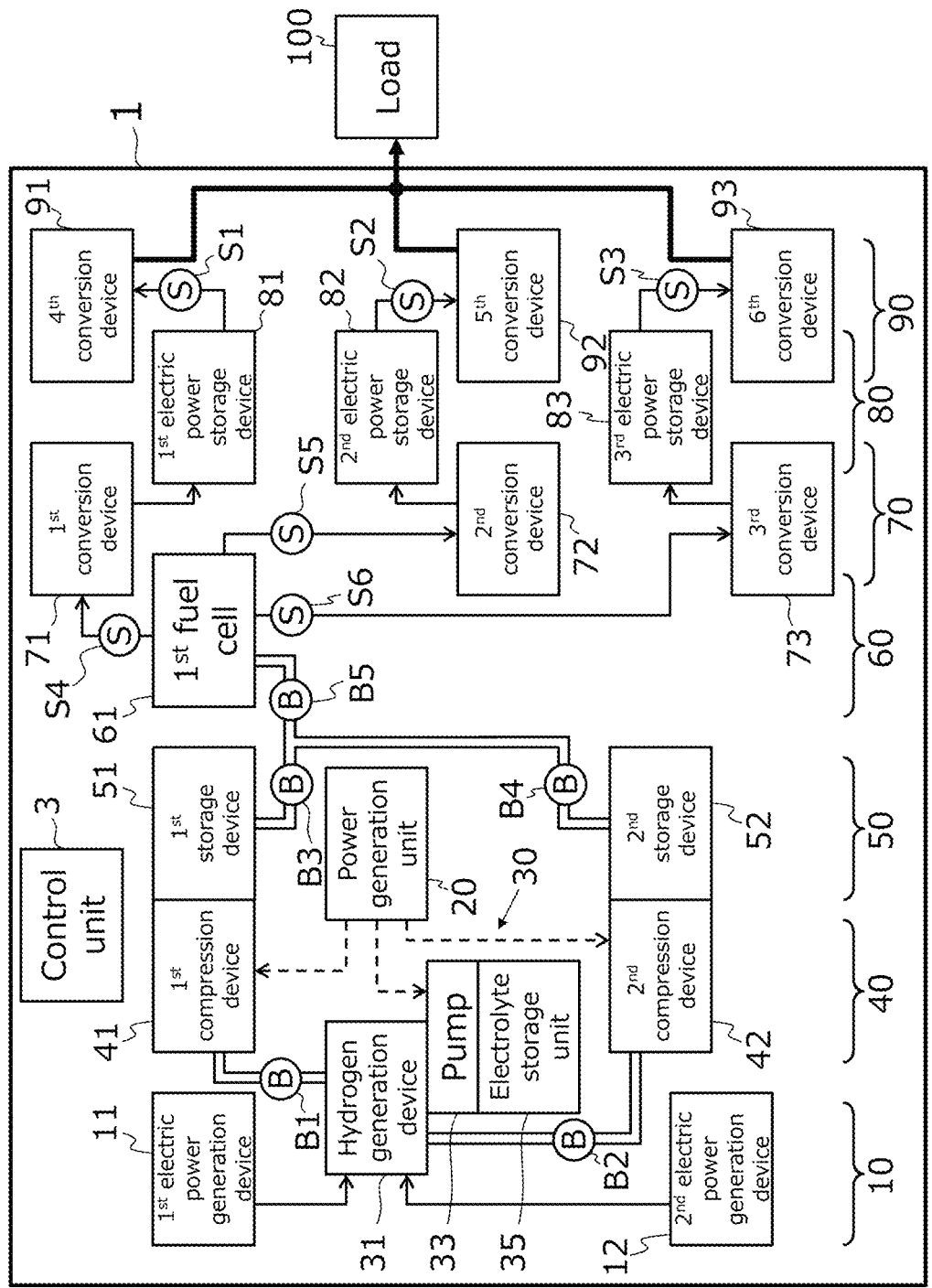
FIG. 2 is a configuration diagram of an electric power supply system according to a second embodiment.

Only one fuel cell may be provided (the second embodiment, see FIG. 2).

In this case, the first fuel cell 61 supplies electric power to the first conversion device 71, the second conversion device 72, and the third conversion device 73. In addition, a fourth switch S4 for performing on/off control of electric power supply from the first fuel cell 61 to the first conversion device 71, a fifth switch S5 for performing on/off control of electric power supply from the first fuel cell 61 to the second conversion device 72, and a sixth switch S6 for performing on/off control of electric power supply from the first fuel cell 61 to the third conversion device 73 are provided.

(Effects of Providing Plurality of Hydrogen Storage Devices and Electric Power Storage Devices)

One (for example, the first storage device 51) of the plurality of hydrogen storage devices can be filled with hydrogen, and the other (for example, the second storage device 52) can supply hydrogen to the fuel cell.

In addition, it is possible to supply electric power to the external load 100 by using the electric power storage device (for example, the first electric power storage device 81) that is not being charged.

Therefore, it is possible to safely fill and discharge hydrogen.

In addition, it is possible to reduce a burden on the electric power storage device and to make the electric power storage device less likely to deteriorate.

Although some embodiments of the present invention have been described, these embodiments have been presented as examples, and are not intended to limit the scope of the invention. These embodiments can be implemented in various other forms, and various omissions, substitutions, and changes can be made without departing from the gist of the invention. The accompanying claims and their equivalents are intended to cover these embodiments and modifications thereof as would fall within the scope and gist of the invention.

REFERENCE SIGNS LIST

1 Electric power supply system
3 Control unit
10 Electric power generation unit
11 First electric power generation device
12 Second electric power generation device
20 Power generation unit
30 Hydrogen supply unit
31 Hydrogen generation device
33 Pump
35 Electrolyte storage unit
40 Compression unit
41 First compression device
42 Second compression device
50 Hydrogen storage unit
51 First storage device
52 Second storage device
60 Fuel cell unit
61 First fuel cell
62 Second fuel cell
63 Third fuel cell
70 First conversion unit
71 First conversion device
72 Second conversion device
73 Third conversion device
80 Electric power storage unit
81 First electric power storage device
82 Second electric power storage device
83 Third electric power storage device
90 Second conversion unit
91 Fourth conversion device
92 Fifth conversion device
93 Sixth conversion device
100 Load
B1 First valve
B2 Second valve
B3 Third valve
B4 Fourth valve
B5 Fifth valve
B6 Sixth valve
B7 Seventh valve
P11 Power supplied from first electric power generation device and second electric power generation device
qv1 Remaining amount of electrolyte in hydrogen generation device
R1 First charge rate (charge rate of first electric power storage device)
R2 Second charge rate (charge rate of second electric power storage device)
R3 Third charge rate (charge rate of third electric power storage device)
rh1 First hydrogen filling rate (hydrogen filling rate of first storage device)
rh2 Second hydrogen filling rate (hydrogen filling rate of second storage device)

rv1 Rotation amount per unit time of power generation unit
S1 First switch
S2 Second switch
S3 Third switch
S4 Fourth switch
S5 Fifth switch
S6 Sixth switch
Thp Electric power threshold
Thqv Remaining amount threshold
Thrc Charge rate threshold
Thrh Hydrogen filling rate threshold
Thrv Rotation amount threshold

The invention claimed is:

1. An electric power supply system that supplies electric power to an external load, the electric power supply system comprising:
   a hydrogen supply unit including a hydrogen generation device that performs electrolysis to generate hydrogen;
   a hydrogen storage unit including a first storage device and a second storage device that store hydrogen obtained by the hydrogen supply unit;
   a fuel cell unit including a first fuel cell and a second fuel cell that generate the electric power based on hydrogen supplied from the hydrogen storage unit;
   an electric power storage unit including a first electric power storage device that stores the electric power obtained by the first fuel cell, and a second electric power storage device that stores the electric power obtained by the second fuel cell; and
   a control unit, wherein
   the control unit controls switching a source of supply of hydrogen to the first fuel cell among the first storage device, the second storage device, and both the first storage device and the second storage device,
   the control unit controls switching a source of supply of hydrogen to the second fuel cell among the first storage device, the second storage device, and both the first storage device and the second storage device,
   electric power supply to the load is performed from the first electric power storage device, the second electric power storage device, or both the first electric power storage device and the second electric power storage device,
   when electric power supply from the first electric power storage device to the load is performed, the control unit stops supply of hydrogen to the first fuel cell and allows supply of hydrogen to the second fuel cell,
   when electric power supply from the second electric power storage device to the load is performed, the control unit stops supply of hydrogen to the second fuel cell and allows supply of hydrogen to the first fuel cell, and
   when electric power supply from the first electric power storage device and the second electric power storage device to the load is performed, the control unit stops supply of hydrogen to the first fuel cell and the second fuel cell.

2. The electric power supply system according to claim 1, wherein
   the fuel cell unit includes a third fuel cell that generates the electric power based on hydrogen supplied from the hydrogen storage unit, and
   the electric power storage unit includes a third electric power storage device that stores the electric power obtained by the third fuel cell.

3. The electric power supply system according to claim 2, wherein
   when supply of hydrogen from the first storage device to at least one of the first fuel cell, the second fuel cell, or the third fuel cell is performed, the control unit stops supply of hydrogen from the hydrogen generation device to the first storage device and allows supply of hydrogen from the hydrogen generation device to the second storage device, and
   when supply of hydrogen from the second storage device to at least one of the first fuel cell, the second fuel cell, or the third fuel cell is performed, the control unit stops supply of hydrogen from the hydrogen generation device to the second storage device and allows supply of hydrogen from the hydrogen generation device to the first storage device.

4. The electric power supply system according to claim 2, further comprising
   a first conversion unit including a first conversion device, a second conversion device, and a third conversion device, wherein
   the first conversion device converts a flow of electricity of the electric power from the first fuel cell from direct current to alternating current, further converts the flow from alternating current to direct current, and adjusts a voltage to a predetermined voltage for electric power storage in the first electric power storage device,
   the second conversion device converts a flow of electricity of the electric power from the second fuel cell from direct current to alternating current, further converts the flow from alternating current to direct current, and adjusts a voltage to a predetermined voltage for electric power storage in the second electric power storage device, and
   the third conversion device converts a flow of electricity of the electric power from the third fuel cell from direct current to alternating current, further converts the flow from alternating current to direct current, and adjusts a voltage to a predetermined voltage for electric power storage in the third electric power storage device.

5. The electric power supply system according to claim 1, further comprising
   an electric power generation unit including at least one of a first electric power generation device that generates direct current power based on natural energy or a second electric power generation device that generates alternating current power based on natural energy, wherein
   the hydrogen generation device performs the electrolysis based on the electric power from the electric power generation unit.

6. An electric power supply system that supplies electric power to an external load, the electric power supply system comprising:
   a hydrogen supply unit including a hydrogen generation device that performs electrolysis to generate hydrogen;
   a hydrogen storage unit including a first storage device and a second storage device that store hydrogen obtained by the hydrogen supply unit;
   a fuel cell unit including a first fuel cell and a second fuel cell that generate the electric power based on hydrogen supplied from the hydrogen storage unit;
   an electric power storage unit including a first electric power storage device that stores the electric power obtained by the first fuel cell, and a second electric power storage device that stores the electric power obtained by the second fuel cell;

a control unit, an electric power generation unit including at least one of a first electric power generation device that generates direct current power based on natural energy or a second electric power generation device that generates alternating current power based on natural energy;

a compression unit configured to compress hydrogen obtained by the hydrogen generation device; and a power generation unit configured to generate power based on natural energy without conversion into electric power, wherein the control unit controls switching a source of supply of hydrogen to the first fuel cell among the first storage device, the second storage device, and both the first storage device and the second storage device, the control unit controls switching a source of supply of hydrogen to the second fuel cell among the first storage device, the second storage device, and both the first storage device and the second storage device, electric power supply to the load is performed from the first electric power storage device, the second electric power storage device, or both the first electric power storage device and the second electric power storage device, the hydrogen generation device performs the electrolysis based on the electric power from the electric power generation unit, and the compression unit is driven based on the power obtained by the power generation unit.

7. The electric power supply system according to claim 6, wherein the hydrogen supply unit includes a pump that supplies an electrolyte to the hydrogen generation device, and the pump and the compression unit are driven based on the power obtained by the power generation unit.

8. The electric power supply system according to claim 6, wherein the power generation unit generates a rotational force as the power based on at least one of wind power or wave force, and the compression unit is driven based on the rotational force obtained by the power generation unit.

9. An electric power supply system that supplies electric power to an external load, the electric power supply system comprising:

a hydrogen supply unit including a hydrogen generation device that performs electrolysis to generate hydrogen;

a hydrogen storage unit including a first storage device and a second storage device that store hydrogen obtained by the hydrogen supply unit;

a fuel cell unit including a fuel cell that generates the electric power based on hydrogen supplied from the hydrogen storage unit;

an electric power storage unit including first and second electric power storage devices that store the electric power obtained by the fuel cell;

a control unit, an electric power generation unit including at least one of a first electric power generation device that generates direct current power based on natural energy or a second electric power generation device that generates alternating current power based on natural energy;

a compression unit configured to compress hydrogen obtained by the hydrogen generation device; and a power generation unit configured to generate power based on natural energy without conversion into electric power, wherein the control unit controls switching a source of supply of hydrogen to the fuel cell among the first storage device, the second storage device, and both the first storage device and the second storage device, electric power supply to the load is performed from the first electric power storage device, the second electric power storage device, or both the first electric power storage device and the second electric power storage device, the hydrogen generation device performs the electrolysis based on the electric power from the electric power generation unit, and the compression unit is driven based on the power obtained by the power generation unit.

\* \* \* \* \*